March 5, 1935.  L. GURRIERI ET AL  1,993,342
LINE SUPPORTING MEANS FOR FISHING RODS
Filed July 7, 1933

LOUIS GURRIERI
SALVATORE GURRIERI
INVENTORS

BY
ATTORNEY

Patented Mar. 5, 1935

1,993,342

UNITED STATES PATENT OFFICE 1,993,342

LINE SUPPORTING MEANS FOR FISHING RODS

Louis Gurrieri and Salvatore Gurrieri, Canarsie, N. Y.

Application July 7, 1933, Serial No. 679,301

2 Claims. (Cl. 43—24)

This invention relates generally to line supporting means or middle guides for fishing rods and more specifically to fishing rods adapted for casting.

An object of the invention is the provision of a middle guide which lessens friction and contact between the fishing line and parts of the middle guide other than the agate or porcelain eye.

A further object of the invention is the provision of a middle guide which by its structure causes shedding of the line easily and quickly thereby avoiding knotting or tangling of the said line when the line is cast for distance. Such latter object is very significant when one considers that the slightest tangling or knotting of the line about a discontinuous projection in the structure of the middle guide or recess or indentation therein would bring about a snapping or breaking of the fishing line during the process of casting.

Anothter object of the invention is the provision of a middle guide which is economical to manufacture, adjustable in its application to the fishing rod and durable.

These objects and other incidental ends and advantages of the invention will be set forth incidentally in the progress of this disclosure.

Accompanying this specification and forming part thereof is a drawing showing several views of a preferred form of the invention in which views corresponding reference characters designate corresponding parts throughout the several of the said views.

Figure 3 is a front view of a line guide shown in Figure 2 while

Figure 1:
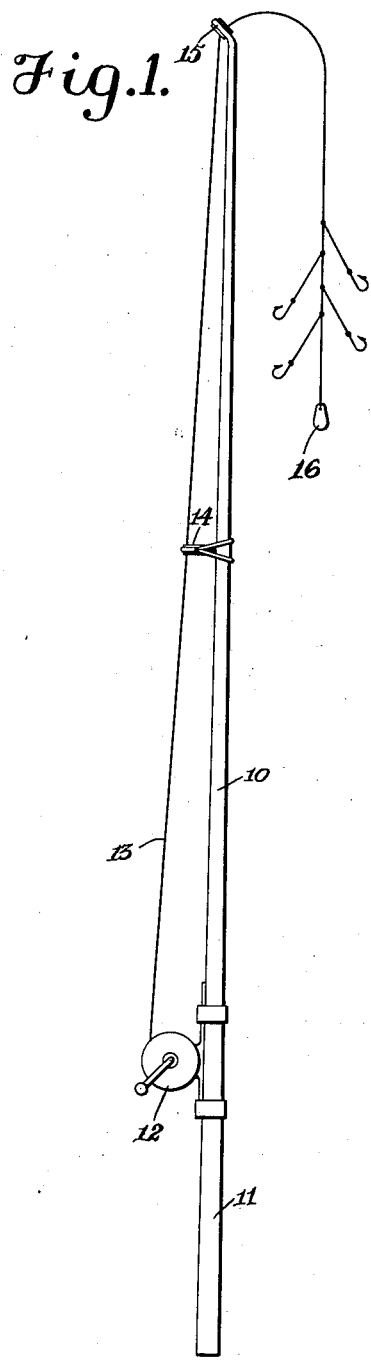
Figure 1 is a view of a fishing rod utilizing the middle guide, the subject matter of the invention herein.

Referring now to the drawing, reference character 10 represents an ordinary and well known fishing rod having a handle portion 11, a reel 12 attached thereto, a fishing line 13 emanating from said reel 12, a middle guide 14, the subject matter of the invention herein, through which the said fishing line 13 passes, a tip end 15 through the eye of which the said fishing line 13 passes, and finally a weight 16 attached to the terminal of the fishing line. Adjacent to the weight or sinker 16 are the normal and ordinary hooks affixed to the line.

Figure 2:
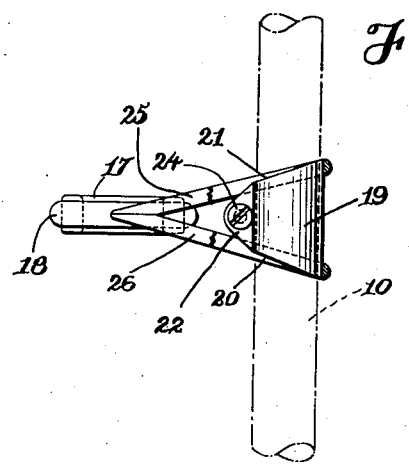
Figure 2 is a side elevation of the middle guide per se, as applied to the fishing rod.
Figure 3:
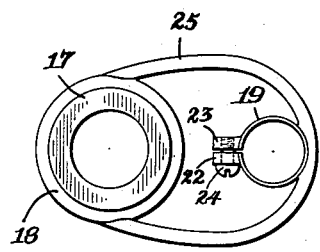
Figure 4:
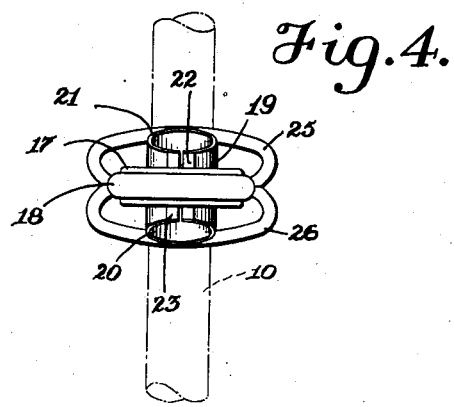
Figure 4 is a top plan view of Figures 2 and 3.

The line supporting means or middle guide hereinbefore referred to by reference character 14 is now to be described in accordance with the preferred structure thereof embodied in Figures 2, 3 and 4. 17 represents the usual eye made of any hard, smooth and brittle material, such as porcelain or agate, and is provided with a securing ring 18 affixed to the circumferential edge and intermediate the width thereof. 19 designates a sleeve adapted to encase a portion of the fishing rod 10, the said sleeve 19 being provided with upwardly extending lugs 22 and 23 serving as the adjustable means of affixation of the middle guide structure with the fishing rod in conjunction with screw 24 penetrating the said lugs. Sleeve 19 is positioned below the eye 17 and along the vertical axis thereof. The forward and rear edges of the said sleeve 19 designated by characters 20 and 21 are conically tapered off to avoid any protrusions which might cause an entanglement or cutting of the fishing line 13 during the act of casting.

The positioning of sleeve 19 relative to the eye 17 and securing ring 18 therefor is effectuated by a set of curved wire rods 25 and 26, the said rods tapering from below the sleeve 19 at the respective edges thereof whereto the said rods are brazed or soldered and extend upwardly to a junction of the ends of the said rods 25 and 26, which said ends are brazed or soldered to the securing ring 18 along a diameter thereof.

It is preferable that the degree of tapering of rods 25 and 26 follow the taper of the forward and rear edges 20 and 21 of sleeve 19.

From the foregoing description it is seen that it becomes well nigh impossible for a fishing line to form a non-shedding loop around the middle guide constructed in accordance with the invention during the act of casting. As a rule when the fishing line is wet, it sticks to the fishing rod and there is a certain amount of slack line between the middle guide and the reel. When the fishing rod is raised for purposes of throwing the line, in addition to vertical movement of the fishing rod, a certain rotary motion takes place whereby the slack manages to form a loop around the middle guide. Where such middle guide has a structure which presents discontinuous or jagged projections or which presents indentations or recesses, the momentum of the weight or sinker 16 will not give such loop a chance of shedding and will cause a breaking of the line. By virtue of the invention herein such breaking by way of entanglement or cutting is rendered next to impossible.

We wish it distinctly understood that minor changes and variations in the grouping of parts, construction of the several parts, kinds of material and integrations may all be resorted to without departing from the spirit of the invention and without departing from the scope of the appended claims.

We claim:

1. A fishing rod guide comprising an eye, a securing ring therefor, an adjustable sleeve member to encase a portion of the fishing rod, and curvilinear guide rods connected to and passing under said sleeve member, the said guide rods thereby connecting the sleeve member to said securing ring whereby the guide structure offers a shedding surface to possible fishing line loops.

2. A fishing rod guide comprising an eye, a securing ring therefor, an adjustable sleeve member to encase a portion of the fishing rod, said sleeve member being in spaced relation to said securing ring, and guide rods passing under said sleeve member adjacent the edges and connecting same to said securing ring whereby the guide structure offers a shedding surface to possible fishing line loops.

LOUIS GURRIERI.
SALVATORE GURRIERI.